(12) United States Patent
Coteus et al.

(10) Patent No.: US 7,685,392 B2
(45) Date of Patent: Mar. 23, 2010

(54) PROVIDING INDETERMINATE READ DATA LATENCY IN A MEMORY SYSTEM

(75) Inventors: Paul W. Coteus, Yorktown Heights, NY (US); Kevin C. Gower, LaGrangeville, NY (US); Warren E. Maule, Cedar Park, TX (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 11/289,193

(22) Filed: Nov. 28, 2005

(65) Prior Publication Data

US 2007/0160053 A1    Jul. 12, 2007

(51) Int. Cl.
*G06F 13/18*  (2006.01)
*G06F 13/372*  (2006.01)
*G06F 13/376*  (2006.01)

(52) U.S. Cl. .................. 711/167; 711/105; 711/158

(58) Field of Classification Search ............... 711/167, 711/158, 5, 104, 105; 709/218, 234
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al | |
| 4,028,675 A | 6/1977 | Frankenberg | 711/106 |
| 4,135,240 A | 1/1979 | Ritchie | |
| 4,472,780 A | 9/1984 | Chenoweth et al. | |

(Continued)

FOREIGN PATENT DOCUMENTS

EP    0229316 A2    7/1987

(Continued)

OTHER PUBLICATIONS

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

(Continued)

*Primary Examiner*—Sheng-Jen Tsai
*Assistant Examiner*—Hal Schnee
(74) *Attorney, Agent, or Firm*—Cantor Colburn LLP

(57) ABSTRACT

A method for providing indeterminate read data latency in a memory system. The method includes determining if a local data packet has been received and storing it into a buffer device. The method also includes determining if the buffer device contains a data packet and determining if an upstream driver for transmitting data packets to a memory controller via an upstream channel is idle, and in response thereto the data packet is transmitted to the upstream driver. The method further includes determining if an upstream data packet has been received and the upstream driver is not idle, then the upstream data packet is stored into the buffer device. The upstream data packet is selectively transmitted to the upstream driver. If the upstream driver is not idle, then any data packets in progress are continued being transmitted to the upstream driver.

25 Claims, 5 Drawing Sheets

U.S. PATENT DOCUMENTS

| | | | |
|---|---|---|---|
| 4,475,194 A | 10/1984 | LaVallee et al. .............. 371/10 |
| 4,479,214 A | 10/1984 | Ryan |
| 4,486,739 A | 12/1984 | Franaszek et al. ..... 340/347 DD |
| 4,641,263 A | 2/1987 | Perlman et al. |
| 4,654,857 A | 3/1987 | Samson et al. |
| 4,723,120 A | 2/1988 | Petty, Jr. ................ 340/825.02 |
| 4,740,916 A | 4/1988 | Martin ....................... 364/900 |
| 4,782,487 A | 11/1988 | Smelser |
| 4,796,231 A | 1/1989 | Pinkham ................ 385/189.05 |
| 4,803,485 A | 2/1989 | Rypinski .................... 370/452 |
| 4,833,605 A | 5/1989 | Terada et al. ................ 364/200 |
| 4,839,534 A | 6/1989 | Clasen ....................... 307/269 |
| 4,943,984 A | 7/1990 | Pechanek et al. ............ 375/109 |
| 4,964,129 A | 10/1990 | Bowden, III et al. |
| 4,964,130 A | 10/1990 | Bowden, III et al. |
| 4,985,828 A | 1/1991 | Shimizu et al. |
| 5,053,947 A | 10/1991 | Heibel et al. ................ 364/200 |
| 5,177,375 A | 1/1993 | Ogawa et al. |
| 5,206,946 A | 4/1993 | Brunk ........................... 710/2 |
| 5,214,747 A | 5/1993 | Cok ............................ 395/27 |
| 5,265,049 A | 11/1993 | Takasugi |
| 5,265,212 A | 11/1993 | Bruce, II .................... 710/113 |
| 5,287,531 A | 2/1994 | Rogers, Jr. et al. .......... 395/800 |
| 5,347,270 A | 9/1994 | Matsuda et al. ............ 340/2.21 |
| 5,357,621 A | 10/1994 | Cox |
| 5,375,127 A | 12/1994 | Leak |
| 5,387,911 A | 2/1995 | Gleichert et al. .............. 341/95 |
| 5,394,535 A | 2/1995 | Ohuchi ....................... 711/155 |
| 5,410,545 A | 4/1995 | Porter et al. |
| 5,454,091 A | 9/1995 | Sites et al. |
| 5,475,690 A | 12/1995 | Burns et al. .............. 370/105.3 |
| 5,513,135 A | 4/1996 | Dell et al. ..................... 365/52 |
| 5,517,626 A | 5/1996 | Archer et al. |
| 5,522,064 A | 5/1996 | Aldereguia et al. |
| 5,544,309 A | 8/1996 | Chang et al. |
| 5,546,023 A | 8/1996 | Borkar et al. |
| 5,561,826 A | 10/1996 | Davies et al. |
| 5,592,632 A | 1/1997 | Leung et al. ................ 395/306 |
| 5,594,925 A | 1/1997 | Harder et al. |
| 5,611,055 A | 3/1997 | Krishan et al. .............. 395/281 |
| 5,613,077 A | 3/1997 | Leung et al. ................ 395/306 |
| 5,627,963 A | 5/1997 | Gabillard et al. .............. 714/42 |
| 5,629,685 A | 5/1997 | Allen et al. |
| 5,661,677 A | 8/1997 | Rondeau, II et al. |
| 5,666,480 A | 9/1997 | Leung et al. ................ 395/180 |
| 5,684,418 A | 11/1997 | Yanagiuchi |
| 5,706,346 A | 1/1998 | Katta et al. |
| 5,737,589 A | 4/1998 | Doi et al. |
| 5,754,804 A | 5/1998 | Cheselka et al. |
| 5,764,155 A | 6/1998 | Kertesz et al. ......... 340/825.08 |
| 5,822,749 A | 10/1998 | Agarwal |
| 5,852,617 A | 12/1998 | Mote, Jr. ..................... 714/726 |
| 5,870,320 A | 2/1999 | Volkonsky |
| 5,870,325 A | 2/1999 | Nielsen et al. ................ 365/63 |
| 5,872,996 A | 2/1999 | Barth et al. .................. 395/853 |
| 5,881,154 A | 3/1999 | Nohara et al. |
| 5,917,760 A | 6/1999 | Millar |
| 5,926,838 A | 7/1999 | Jeddeloh .................... 711/167 |
| 5,928,343 A | 7/1999 | Farmwald et al. ........... 710/104 |
| 5,930,273 A | 7/1999 | Mukojima .................. 714/776 |
| 5,959,914 A | 9/1999 | Gates et al. |
| 5,973,591 A | 10/1999 | Becjtolsheim et al. ......... 365/52 |
| 5,974,493 A | 10/1999 | Okumura et al. ............ 710/307 |
| 5,995,405 A | 11/1999 | Trick ............................ 365/63 |
| 6,003,121 A | 12/1999 | Wirt |
| 6,011,732 A | 1/2000 | Harrison et al. |
| 6,038,132 A | 3/2000 | Tokunaga et al. ............ 361/760 |
| 6,049,476 A | 4/2000 | Laudon et al. ................ 365/52 |
| 6,076,158 A | 6/2000 | Sites et al. |
| 6,078,515 A | 6/2000 | Nielsen et al. ................ 365/63 |
| 6,081,868 A | 6/2000 | Brooks |
| 6,085,276 A | 7/2000 | Vandoren et al. |
| 6,088,817 A | 7/2000 | Haulin |
| 6,096,091 A | 8/2000 | Hartmann ..................... 716/17 |
| 6,128,746 A | 10/2000 | Clark et al. .................. 713/324 |
| 6,145,028 A | 11/2000 | Shank et al. |
| 6,158,040 A | 12/2000 | Ho |
| 6,170,047 B1 | 1/2001 | Dye |
| 6,170,059 B1 | 1/2001 | Pruett et al. |
| 6,173,382 B1 | 1/2001 | Dell et al. |
| 6,185,718 B1 | 2/2001 | Dell et al. |
| 6,198,304 B1 | 3/2001 | Sasaki |
| 6,215,686 B1 | 4/2001 | Deneroff et al. ............... 365/52 |
| 6,216,247 B1 | 4/2001 | Creta et al. |
| 6,219,288 B1 | 4/2001 | Braceras et al. |
| 6,219,760 B1 | 4/2001 | McMinn |
| 6,233,639 B1 | 5/2001 | Dell et al. |
| 6,260,127 B1 | 7/2001 | Olarig et al. ................. 711/167 |
| 6,262,493 B1 | 7/2001 | Garnett |
| 6,285,172 B1 | 9/2001 | Torbey |
| 6,292,903 B1 | 9/2001 | Coteus et al. ................ 713/401 |
| 6,301,636 B1 | 10/2001 | Schultz et al. ............... 711/108 |
| 6,308,247 B1 | 10/2001 | Ackerman et al. |
| 6,317,352 B1 | 11/2001 | Halbert et al. ................. 365/52 |
| 6,321,343 B1 | 11/2001 | Toda ........................... 713/600 |
| 6,338,113 B1 | 1/2002 | Kubo et al. .................. 711/105 |
| 6,349,390 B1 | 2/2002 | Dell et al. |
| 6,357,018 B1 | 3/2002 | Stuewe et al. |
| 6,370,631 B1 | 4/2002 | Dye |
| 6,378,018 B1 | 4/2002 | Tsern et al. .................. 710/129 |
| 6,381,685 B2 | 4/2002 | Dell et al. |
| 6,393,512 B1 | 5/2002 | Chen et al. |
| 6,393,528 B1 | 5/2002 | Arimilli et al. |
| 6,408,398 B1 | 6/2002 | Frecker et al. |
| 6,425,044 B1 | 7/2002 | Jeddeloh |
| 6,446,174 B1 | 9/2002 | Dow |
| 6,446,224 B1 | 9/2002 | Chang et al. |
| 6,461,013 B1 | 10/2002 | Simon |
| 6,467,013 B1 | 10/2002 | Nizar |
| 6,473,836 B1 | 10/2002 | Ikeda |
| 6,477,614 B1 | 11/2002 | Leddige et al. |
| 6,477,615 B1 | 11/2002 | Tanaka |
| 6,483,755 B2 | 11/2002 | Leung et al. ............ 365/189.05 |
| 6,484,271 B1 | 11/2002 | Gray |
| 6,487,102 B1 | 11/2002 | Halbert et al. |
| 6,487,627 B1 | 11/2002 | Willke et al. ................ 710/306 |
| 6,493,250 B2 | 12/2002 | Halbert et al. ................. 365/63 |
| 6,496,540 B1 | 12/2002 | Windmer ..................... 375/242 |
| 6,496,910 B1 | 12/2002 | Baentsch et al. |
| 6,499,070 B1 | 12/2002 | Whetsel |
| 6,502,161 B1 | 12/2002 | Perego et al. .................... 711/5 |
| 6,505,305 B1 | 1/2003 | Olarig |
| 6,507,888 B2 | 1/2003 | Wu et al. ..................... 711/105 |
| 6,510,100 B2 | 1/2003 | Grundon et al. ............. 365/233 |
| 6,513,091 B1 | 1/2003 | Blackmon et al. ........... 710/316 |
| 6,526,469 B1 | 2/2003 | Drehmel et al. |
| 6,530,007 B2 | 3/2003 | Olarig |
| 6,532,525 B1 | 3/2003 | Aleksic et al. ............... 711/168 |
| 6,546,359 B1 | 4/2003 | Week ........................... 702/186 |
| 6,549,971 B1 | 4/2003 | Cecchi et al. ................ 710/306 |
| 6,553,450 B1 | 4/2003 | Dodd et al. .................. 711/105 |
| 6,557,069 B1 | 4/2003 | Drehmel et al. ............. 710/307 |
| 6,564,329 B1 | 5/2003 | Cheung et al. |
| 6,584,576 B1 | 6/2003 | Co |
| 6,587,912 B2 | 7/2003 | Leddige |
| 6,590,827 B2 | 7/2003 | Chang et al. |
| 6,594,713 B1 | 7/2003 | Fuoco et al. |
| 6,594,748 B1 | 7/2003 | Lin |
| 6,601,121 B2 | 7/2003 | Singh et al. ................. 710/112 |
| 6,601,149 B1 | 7/2003 | Brock et al. |
| 6,604,180 B2 | 8/2003 | Jeddeloh |
| 6,606,692 B2 * | 8/2003 | Hill et al. .................... 711/158 |
| 6,611,902 B2 | 8/2003 | Kuroda et al. |
| 6,611,905 B1 | 8/2003 | Grundon et al. ............. 711/167 |

| Patent No. | Date | Inventor | Class |
|---|---|---|---|
| 6,622,217 B2 | 9/2003 | Gharachorloo et al. | 711/141 |
| 6,622,227 B2 | 9/2003 | Zumkehr et al. | |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,636,957 B2 | 10/2003 | Stevens et al. | |
| 6,643,745 B1 | 11/2003 | Palanca et al. | |
| 6,671,376 B1 | 12/2003 | Koto et al. | 380/210 |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,799,241 B2 | 9/2004 | Kahn et al. | |
| 6,832,329 B2 | 12/2004 | Ahrens et al. | |
| 6,839,393 B1 | 1/2005 | Sidiropoulos | 375/371 |
| 6,845,472 B2 | 1/2005 | Walker et al. | |
| 6,847,583 B2 | 1/2005 | Janzen et al. | |
| 6,851,036 B1 | 2/2005 | Toda et al. | |
| 6,874,102 B2 | 3/2005 | Doody et al. | |
| 6,877,076 B1 | 4/2005 | Cho et al. | |
| 6,877,078 B2 | 4/2005 | Fujiwara et al. | |
| 6,879,468 B2 | 4/2005 | Nakamura et al. | |
| 6,882,082 B2 | 4/2005 | Greeff et al. | |
| 6,889,284 B1 | 5/2005 | Nizar et al. | |
| 6,898,726 B1 | 5/2005 | Lee | |
| 6,901,494 B2 | 5/2005 | Zumkehr et al. | |
| 6,910,146 B2 | 6/2005 | Dow | |
| 6,918,068 B2 | 7/2005 | Vail et al. | |
| 6,925,534 B2 | 8/2005 | David | |
| 6,938,119 B2 | 8/2005 | Kohn et al. | |
| 6,944,084 B2 | 9/2005 | Wilcox | |
| 6,948,091 B2 | 9/2005 | Bartels et al. | |
| 6,949,950 B2 | 9/2005 | Takahaski et al. | |
| 6,952,761 B2 | 10/2005 | John | |
| 6,965,952 B2 * | 11/2005 | Echartea et al. | 710/30 |
| 6,977,536 B2 | 12/2005 | Chin-Chich et al. | 327/116 |
| 6,977,979 B1 | 12/2005 | Hartwell et al. | |
| 6,993,612 B2 | 1/2006 | Porterfield | |
| 6,996,639 B2 | 2/2006 | Narad | |
| 6,996,766 B2 | 2/2006 | Cypher | |
| 7,039,755 B1 | 5/2006 | Helms | |
| 7,047,370 B1 | 5/2006 | Jeter, Jr. et al. | |
| 7,047,371 B2 | 5/2006 | Dortu | |
| 7,047,373 B2 | 5/2006 | Kim | |
| 7,047,384 B2 | 5/2006 | Bodas et al. | |
| 7,076,700 B2 | 7/2006 | Rieger | |
| 7,091,890 B1 | 8/2006 | Sasaki et al. | |
| 7,103,792 B2 | 9/2006 | Moon | |
| 7,120,743 B2 | 10/2006 | Meyer et al. | |
| 7,133,790 B2 | 11/2006 | Liou | |
| 7,133,972 B2 | 11/2006 | Jeddeloh | |
| 7,155,016 B1 | 12/2006 | Betts et al. | |
| 7,177,211 B2 | 2/2007 | Zimmerman | |
| 7,194,593 B2 | 3/2007 | Schnepper | |
| 7,197,594 B2 | 3/2007 | Raz et al. | |
| 7,197,670 B2 | 3/2007 | Boatright et al. | |
| 7,203,318 B2 | 4/2007 | Collum et al. | |
| 7,206,887 B2 | 4/2007 | Jeddeloh | |
| 7,206,962 B2 | 4/2007 | Deegan | |
| 7,210,059 B2 | 4/2007 | Jeddeloh | |
| 7,216,196 B2 | 5/2007 | Jeddeloh | |
| 7,216,276 B1 * | 5/2007 | Azimi et al. | 714/733 |
| 7,222,213 B2 | 5/2007 | James | |
| 7,227,949 B2 | 6/2007 | Heegard et al. | |
| 7,240,145 B2 | 7/2007 | Holman | |
| 7,260,685 B2 | 8/2007 | Lee et al. | |
| 7,266,634 B2 | 9/2007 | Ware et al. | |
| 7,269,765 B1 | 9/2007 | Charlton et al. | |
| 7,290,190 B2 | 10/2007 | Obara | |
| 7,296,129 B2 | 11/2007 | Gower et al. | |
| 7,300,545 B2 | 11/2007 | Ohara et al. | |
| 7,313,583 B2 | 12/2007 | Porten et al. | |
| 7,318,130 B2 | 1/2008 | Morrow et al. | |
| 7,319,340 B2 | 1/2008 | Jeddeloh et al. | |
| 7,321,979 B2 | 1/2008 | Lee | |
| 7,334,159 B1 | 2/2008 | Callaghan | |
| 7,353,316 B2 | 4/2008 | Erdmann | |
| 7,363,419 B2 | 4/2008 | Cronin et al. | |
| 7,363,436 B1 | 4/2008 | Yeh et al. | |
| 7,370,134 B2 | 5/2008 | Jeddeloh | |
| 7,376,146 B2 | 5/2008 | Beverly et al. | |
| 7,386,575 B2 | 6/2008 | Bashant et al. | |
| 7,386,771 B2 | 6/2008 | Shuma | |
| 7,404,118 B1 | 7/2008 | Baguette et al. | |
| 7,418,526 B2 | 8/2008 | Jeddeloh | |
| 7,421,525 B2 * | 9/2008 | Polzin et al. | 710/100 |
| 7,430,145 B2 | 9/2008 | Weiss et al. | |
| 7,433,258 B2 | 10/2008 | Rao et al. | |
| 7,461,286 B2 | 12/2008 | James | |
| 7,481,526 B2 | 1/2009 | Inoue | |
| 7,496,777 B2 | 2/2009 | Kapil | |
| 2001/0000822 A1 | 5/2001 | Dell et al. | 711/170 |
| 2001/0003839 A1 | 6/2001 | Kondo | |
| 2001/0029566 A1 | 10/2001 | Shin | |
| 2001/0029592 A1 | 10/2001 | Walker et al. | |
| 2002/0019926 A1 | 2/2002 | Huppenthal et al. | 712/15 |
| 2002/0038405 A1 | 3/2002 | Leddige et al. | |
| 2002/0059439 A1 | 5/2002 | Arroyo et al. | |
| 2002/0083255 A1 | 6/2002 | Greeff et al. | 710/305 |
| 2002/0103988 A1 | 8/2002 | Dornier | |
| 2002/0112119 A1 | 8/2002 | Halbert et al. | |
| 2002/0112194 A1 | 8/2002 | Uzelac | 713/500 |
| 2002/0124195 A1 | 9/2002 | Nizar | |
| 2002/0124201 A1 | 9/2002 | Edwards et al. | |
| 2002/0147898 A1 | 10/2002 | Rentschler et al. | |
| 2002/0174274 A1 | 11/2002 | Wu et al. | |
| 2003/0009632 A1 | 1/2003 | Arimilli et al. | |
| 2003/0028701 A1 | 2/2003 | Rao et al. | |
| 2003/0033364 A1 | 2/2003 | Garnett et al. | 709/203 |
| 2003/0051055 A1 | 3/2003 | Parrella et al. | |
| 2003/0056183 A1 | 3/2003 | Kobayahi | |
| 2003/0084309 A1 | 5/2003 | Kohn | 713/189 |
| 2003/0090879 A1 | 5/2003 | Doblar et al. | 361/728 |
| 2003/0105938 A1 | 6/2003 | Cooksey et al. | |
| 2003/0118044 A1 * | 6/2003 | Blanc et al. | 370/414 |
| 2003/0126363 A1 | 7/2003 | David | |
| 2003/0214974 A1 * | 11/2003 | Beverly et al. | 370/476 |
| 2003/0223303 A1 | 12/2003 | Lamb et al. | 365/230.06 |
| 2003/0235222 A1 * | 12/2003 | Bridges et al. | 370/542 |
| 2003/0236959 A1 | 12/2003 | Johnson et al. | 711/167 |
| 2004/0006674 A1 | 1/2004 | Hargis et al. | 711/156 |
| 2004/0049723 A1 | 3/2004 | Obara | 714/729 |
| 2004/0098549 A1 | 5/2004 | Dorst | |
| 2004/0117588 A1 | 6/2004 | Arimilli et al. | |
| 2004/0123222 A1 | 6/2004 | Widmer | |
| 2004/0128474 A1 | 7/2004 | Vorbach | 712/10 |
| 2004/0148482 A1 | 7/2004 | Grundy et al. | |
| 2004/0163028 A1 | 8/2004 | Olarig | |
| 2004/0165609 A1 | 8/2004 | Herbst et al. | |
| 2004/0199363 A1 | 10/2004 | Bohizic et al. | |
| 2004/0205433 A1 | 10/2004 | Gower et al. | |
| 2004/0230718 A1 | 11/2004 | Polzin et al. | |
| 2004/0246767 A1 | 12/2004 | Vogt | 365/154 |
| 2004/0250153 A1 | 12/2004 | Vogt | 713/500 |

| | | | | | | |
|---|---|---|---|---|---|---|
| 2004/0260909 | A1 | 12/2004 | Lee et al. | GB | 2396711 A | 6/2004 |
| 2004/0260957 | A1 | 12/2004 | Jeddeloh et al. | JP | 59153353 | 9/1984 |
| 2005/0022065 | A1 | 1/2005 | Dixon et al. | JP | 59153353 A | 9/1984 |
| 2005/0023560 | A1 | 2/2005 | Ahn et al. .................... 257/200 | JP | 401144140 A | 6/1989 |
| 2005/0027941 | A1 | 2/2005 | Wang et al. | JP | 04326140 A | 11/1992 |
| 2005/0033906 | A1 | 2/2005 | Mastronarde et al. | JP | 10011971 | 1/1998 |
| 2005/0044305 | A1 | 2/2005 | Jakobs et al. | JP | 02004139552 A | 5/2004 |
| 2005/0044457 | A1 | 2/2005 | Jeddeloh | JP | 02008003711 A | 1/2008 |
| 2005/0050237 | A1 | 3/2005 | Jeddeloh | WO | 9621188 | 7/1996 |
| 2005/0050255 | A1 | 3/2005 | Jeddeloh | WO | 9812651 A1 | 3/1998 |
| 2005/0066136 | A1 | 3/2005 | Schnepper | WO | 0004481 A2 | 1/2000 |
| 2005/0071542 | A1 | 3/2005 | Weber et al. | WO | 0223353 A2 | 3/2002 |
| 2005/0071707 | A1 | 3/2005 | Hampel | WO | WO2005038660 | 4/2005 |
| 2005/0080581 | A1 | 4/2005 | Zimmerman et al. | WO | 2007109888 A1 | 10/2007 |
| 2005/0081085 | A1 | 4/2005 | Ellis et al. | | | |
| 2005/0081114 | A1 | 4/2005 | Ackaret et al. | | | |
| 2005/0081129 | A1 | 4/2005 | Shah et al. | | | |
| 2005/0086424 | A1 | 4/2005 | Oh et al. | | | |
| 2005/0086441 | A1 | 4/2005 | Meyer et al. | | | |
| 2005/0097249 | A1 | 5/2005 | Oberlin et al. | | | |
| 2005/0120157 | A1 | 6/2005 | Chen et al. .................. 710/313 | | | |
| 2005/0125702 | A1 | 6/2005 | Huang et al. | | | |
| 2005/0125703 | A1 | 6/2005 | Lefurgy et al. | | | |
| 2005/0138246 | A1 | 6/2005 | Chen et al. | | | |
| 2005/0138267 | A1 | 6/2005 | Bains et al. | | | |
| 2005/0144399 | A1 | 6/2005 | Hosomi | | | |
| 2005/0149665 | A1 | 7/2005 | Wolrich et al. | | | |
| 2005/0166006 | A1 | 7/2005 | Talbot et al. | | | |
| 2005/0177677 | A1 | 8/2005 | Jeddeloh | | | |
| 2005/0177690 | A1 | 8/2005 | LaBerge | | | |
| 2005/0204216 | A1 | 9/2005 | Daily et al. .................. 714/724 | | | |
| 2005/0216678 | A1 | 9/2005 | Jeddeloh | | | |
| 2005/0220097 | A1* | 10/2005 | Swami et al. ................ 370/389 | | | |
| 2005/0223196 | A1 | 10/2005 | Knowles | | | |
| 2005/0229132 | A1 | 10/2005 | Butt et al. ..................... 716/10 | | | |
| 2005/0248997 | A1 | 11/2005 | Lee | | | |
| 2005/0257005 | A1 | 11/2005 | Jeddeloh | | | |
| 2005/0259496 | A1 | 11/2005 | Hsu et al. | | | |
| 2005/0289377 | A1 | 12/2005 | Luong | | | |
| 2006/0004953 | A1* | 1/2006 | Vogt ........................... 711/105 | | | |
| 2006/0010339 | A1 | 1/2006 | Klein | | | |
| 2006/0036826 | A1 | 2/2006 | Dell et al. | | | |
| 2006/0036827 | A1 | 2/2006 | Dell et al. | | | |
| 2006/0080584 | A1 | 4/2006 | Hartnett et al. | | | |
| 2006/0085602 | A1 | 4/2006 | Huggahalli et al. | | | |
| 2006/0095592 | A1 | 5/2006 | Borkenhagen | | | |
| 2006/0095679 | A1 | 5/2006 | Edirisooriya | | | |
| 2006/0104371 | A1* | 5/2006 | Schuermans et al. ........ 375/257 | | | |
| 2006/0107175 | A1 | 5/2006 | Dell et al. | | | |
| 2006/0112238 | A1 | 5/2006 | Jamil et al. | | | |
| 2006/0161733 | A1 | 7/2006 | Beckett et al. | | | |
| 2006/0168407 | A1 | 7/2006 | Stern | | | |
| 2006/0190674 | A1 | 8/2006 | Poechmueller | | | |
| 2006/0195631 | A1 | 8/2006 | Rajamani | | | |
| 2006/0224764 | A1* | 10/2006 | Shinohara et al. ........... 709/232 | | | |
| 2006/0277365 | A1 | 12/2006 | Pong | | | |
| 2006/0288172 | A1 | 12/2006 | Lee et al. | | | |
| 2007/0005922 | A1* | 1/2007 | Swaminathan et al. ...... 711/167 | | | |
| 2007/0025304 | A1 | 2/2007 | Leelahakriengkrai et al. | | | |
| 2007/0038907 | A1* | 2/2007 | Jeddeloh et al. ............. 714/718 | | | |
| 2007/0067382 | A1 | 3/2007 | Sun | | | |
| 2007/0160053 | A1 | 7/2007 | Coteus | | | |
| 2008/0043808 | A1 | 2/2008 | Hsu et al. | | | |
| 2008/0162807 | A1 | 7/2008 | Rothman et al. | | | |
| 2008/0163014 | A1 | 7/2008 | Crawford et al. | | | |
| 2008/0222379 | A1 | 9/2008 | Jeddeloh | | | |
| 2009/0006900 | A1 | 1/2009 | Lastras-Montano et al. | | | |

FOREIGN PATENT DOCUMENTS

| | | |
|---|---|---|
| EP | 0470734 A1 | 2/1992 |
| EP | 1429340 A2 | 6/2004 |
| EP | 0899743 B1 | 11/2004 |

OTHER PUBLICATIONS

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Reapeaters in Bidirectional Buses;" IEEE Transactions on Computer-Aided Design of Integrated Cirucits and Systems, vol. 25, No. 3, Mar. 2005, pp. 461-469.

Seceleanu et al.; "Segment Arbiter as Action System;" IEEE 2003 pp. 249-252.

PCT International Search Report PCT/EP2006/068984. Mailed Feb. 16, 2007.

PCT International Search Report PCT/EP2007/057916. Mailed Dec. 14, 2007.

Benini, Luca, et al. "System-Level Power Optimization: Techniques and Tools", ACM Transactions on Design Automation of Electronic Systems, vol. 6, No. 2, Apr. 2001, pp. 149-206.

Boudon, et al., "Novel Bus Reconfiguration Scheme With Spare Lines", IBM Technical Disclosure Bulletin, May 1987, vol. 29, No. 12, pp. 1-3.

Massoud Pedram, "Power Minimization in IC Design Principles and Applications", ACM Transactions on Design Automation of Electronic Systems vol. 1, No. 1, Jan. 1996, pp. 3-56.

NB940259 (IBM Technical Disclosure Bulletin, Feb. 1994; vol. 37; pp. 59-64).

P.R. Panda, "Data and Memory Optimization Techniques For Embedded Systems", ACM Transactions on Design Automation of Electronic Systems, vol. 6, No. 2, Apr. 2001, pp. 149-206.

Singh, S., et al., "Bus Sparing for Fault-Tolerant System Design", IBM Technical Disclosure Bulletin, Dec. 1991, vol. 34, No. 71, pp. 117-118.

U.S. Appl. No. 11/419,586, filed May 22, 2006. Robert Tremaine. "Systems and Methods for Providing Remote Pre-Fetch Buffers".

Understanding System Memory and CPU Speeds: A Layman's Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No. 2, May 2001, pp. 111-170.

Wang, et al "Guided Region Prefetching: A Cooperative Hardware/Software Approach", pp. 388-398.

Natarajan, et al "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Wikipedia, Serial Communications, [online], [retrieved Apr. 10, 2007 from the Internet], http://en.wikipedia.org/wiki/Serial_communications, 3 pages.

International Search Report, International Application No. PCT/EP2007/054929, International Publication No. WO 2007/135144 A1, received Mar. 21, 2008.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommuications", Second Edition, John Wiley & Sons, Inc. 1987. 3 pgs.

PCT Search Report. PCT/EP2007/057915. Mailed Nov. 7, 2007.

Joe Jeddeloh, Fully Buffered DIMM (FB-DIMM), XP002490174, Advanced Systems Technology, Micron Technology, Inc. Apr. 16, 2008, 23 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

European Search Report, European Patent Application 05106700.7, received Aug. 11, 2008.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

IBM. IBM WebSphere Enterprise Service Bus. Version 6.0.2 2006 (165-0071-USC NOA Jun. 12, 2009).

BEA Systems Inc. Integration of Clustered BEA AquaLogic Service Bus Domain and Remote Tibco Enterprise Message Service 4.2.0 for Messaging Application in SOA. BEA White Paper. 2006 (165-0071-USC NOA Jun. 12, 2009).

Oracle. Oracle Enterprise Service Bus. Oracle Data Sheet. Oct. 2006 (165-0071-USC NOA Jun. 12, 2009).

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.

PCT/EP2007057915, International Search Report, Mailed Nov. 7, 2007, pp. 9.

Panda et al., "Data and Memory Optimization Techniques for Embedded Systems"ACM Transactions on Design Automation of Electronic Systems, vol. 6, No. 2, Apr. 2001, pp. 149-206.

* cited by examiner

PROVIDING INDETERMINATE READ DATA LATENCY IN A MEMORY SYSTEM

BACKGROUND OF THE INVENTION

This invention relates to memory systems comprised of hub devices connected to a memory controller by a daisy chained channel. The hub devices are attached to, or reside upon, memory modules that contain memory devices. More particularly, this invention relates to the flow control of read data and the identification of read data returned to the controller by each hub device.

Many high performance computing main memory systems use multiple fully buffered memory modules connected to a memory controller by one or more channels. The memory modules contain a hub device and multiple memory devices. The hub device fully buffers command, address and data signals between the memory controller and the memory devices. The flow of read data is controlled using either a leveled latency or position dependant latency technique. In both cases, the memory controller is able to predict the return time of read data requested from the memory modules and to schedule commands to avoid collisions as read data is merged onto the controller interface by each memory module.

In some cases, the memory controller is able to issue a read data delay adder along with the read command. This instructs the targeted hub device to add additional delay to the return of read data in order to simplify the issuing of commands and to avoid collisions. In all cases, the read data must be returned in the order in which it was requested. Further, the total read data latency must be completely predictable by the memory controller. During run time operations, these two restrictions result in additional gaps being added to packets of read data that are returned from the memory modules. This adds latency to the average read operation. In addition, hubs are not able to use indeterminate techniques to return read data faster or slower than normal. These techniques include, but are not limited to, caching read data locally, reading memory devices speculatively, independently managing memory device address pages, data compression, etc.

To optimize average read data latency under real workload conditions, and to enable advanced hub device capabilities, what is needed is a way to allow memory modules to return read data to the memory controller at an unpredicted time. This must be done in a way that does not corrupt read data and that allows the memory controller to identify each read data packet. Preventing data corruption by avoiding data collisions is especially complicated as hub devices merge local read data onto a cascaded memory controller channel.

BRIEF SUMMARY OF THE INVENTION

Exemplary embodiments include a method for providing indeterminate read data latency. The method includes determining if a local data packet has been received. If a local data packet has been received, then the local data packet is stored into a buffer device. The method also includes determining if the buffer device contains a data packet and determining if an upstream driver for transmitting data packets to a memory controller via an upstream channel is idle. If the buffer contains a data packet and the upstream driver is idle, then the data packet is transmitted to the upstream driver. The method further includes determining if an upstream data packet has been received. The upstream data packet is in a frame format that includes a frame start indicator and an identification tag for use by the memory controller in associating the upstream data packet with its corresponding read instruction. If an upstream data packet has been received and the upstream driver is not idle, then the upstream data packet is stored into the buffer device. If an upstream data packet has been received and the buffer device does not contain a data packet and the upstream driver is idle, then the upstream data packet is transmitted to the upstream driver. If the upstream driver is not idle, then any data packets in progress are continued being transmitted to the upstream driver.

Exemplary embodiments include a hub device in a memory system. The hub device includes a device for receiving data packets, an upstream driver for transmitting data packets to a memory controller via an upstream channel and a mechanism including instructions for facilitating indeterminate read data latency. The device for receiving data packets includes an upstream receiver for receiving upstream data packets from a downstream hub device and a memory interface for receiving local data packets from a local storage device. Each data packet is in a frame format that includes a frame start indicator and an identification tag for use by a memory controller in associating the data packet with its corresponding read instruction. The instructions on the mechanism facilitate determining if a local data packet has been received. If a local data packet has been received, then the local data packet is stored into a buffer device. The instructions also facilitate determining if the buffer device contains a data packet and determining if the upstream driver is idle. If the buffer contains a data packet and the upstream driver is idle, then the data packet is transmitted to the upstream driver. The instructions further facilitate determining if an upstream data packet has been received. If an upstream data packet has been received and the upstream driver is not idle, then the upstream data packet is stored into the buffer device. If an upstream data packet has been received and the buffer device does not contain a data packet and the upstream driver is idle, then the upstream data packet is transmitted to the upstream driver. If the upstream driver is not idle, then any data packets in progress are continued being transmitted to the upstream driver.

Exemplary embodiments include a memory subsystem with one or more memory modules. The memory modules include one or more memory devices connected to a memory controller by a daisy chained channel. The read data is returned to the memory controller using a frame format that includes an identification tag and frame start indicator. The memory system also includes one or more hub devices on the memory modules for buffering address, commands and data. The hub devices include controller channel buffers that are used in conjunction with a preemptive local data merge algorithm to minimize read data latency and enable indeterminate read data return times to the memory controller.

Further exemplary embodiments include a memory system with one or more memory modules. The memory modules include memory devices that are connected to a memory controller by a daisy chained channel. The read data is returned to the memory controller using a frame format that includes an identification tag and frame start indicator. The memory system also includes one or more hub devices connected to the memory modules for buffering address, commands and data. The hub devices include controller channel buffers that are used in conjunction with a preemptive local data merge algorithm to minimize read data latency and enable indeterminate read data return times to the memory controller.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments utilize controller channel buffers (CCBs), read data frame formats with identification tags and a preemptive data merge technique to enable minimized and indeterminate read data latency. Exemplary embodiments allow memory modules to return read data to a memory controller at an unpredicted time. Identification tag information is added to the read data packet to indicate the read command that the data is a result of, as well as the hub where the data was read. The identification tag information is utilized by the controller to match the read data packet to the read commands issued by the controller. By using the identification tag information, read data can be returned in an order that is different from the issue order of the corresponding read commands.

Exemplary embodiments also provide a preemptive data merge process to prevent data collisions on the upstream channel when implementing the indeterminate read data latency. A CCB is added to the hub device to temporarily store read data. When a memory device on the memory module reads data, the data is transferred from the memory interface to the buffer. When the hub device detects that an upstream data packet (i.e., a data packet being sent to the controller from a hub device that is downstream from the detecting hub device) is not in the middle of being transferred into the detecting hub device via an upstream channel (it typically takes several transfers to send the entire data packet), the detecting hub device checks to see if there is a read data packet in its CCB that is waiting to be sent upstream. If the hub device detects a read data packet in the CCB it drives the read data packet from the CCB onto the upstream data bus. In the meantime, if a new upstream data packet is received via the upstream data bus, the data packet is stored in the CCB on the hub device. In this manner, data packets coming upstream do not collide with data packets being sent upstream from the CCB on the hub device. In the case where there is more than one data packet in the CCB, a variety of methods may be implemented to determine which data packet to send next (e.g., the data packet from the oldest read command may be sent first).

Figure 1:
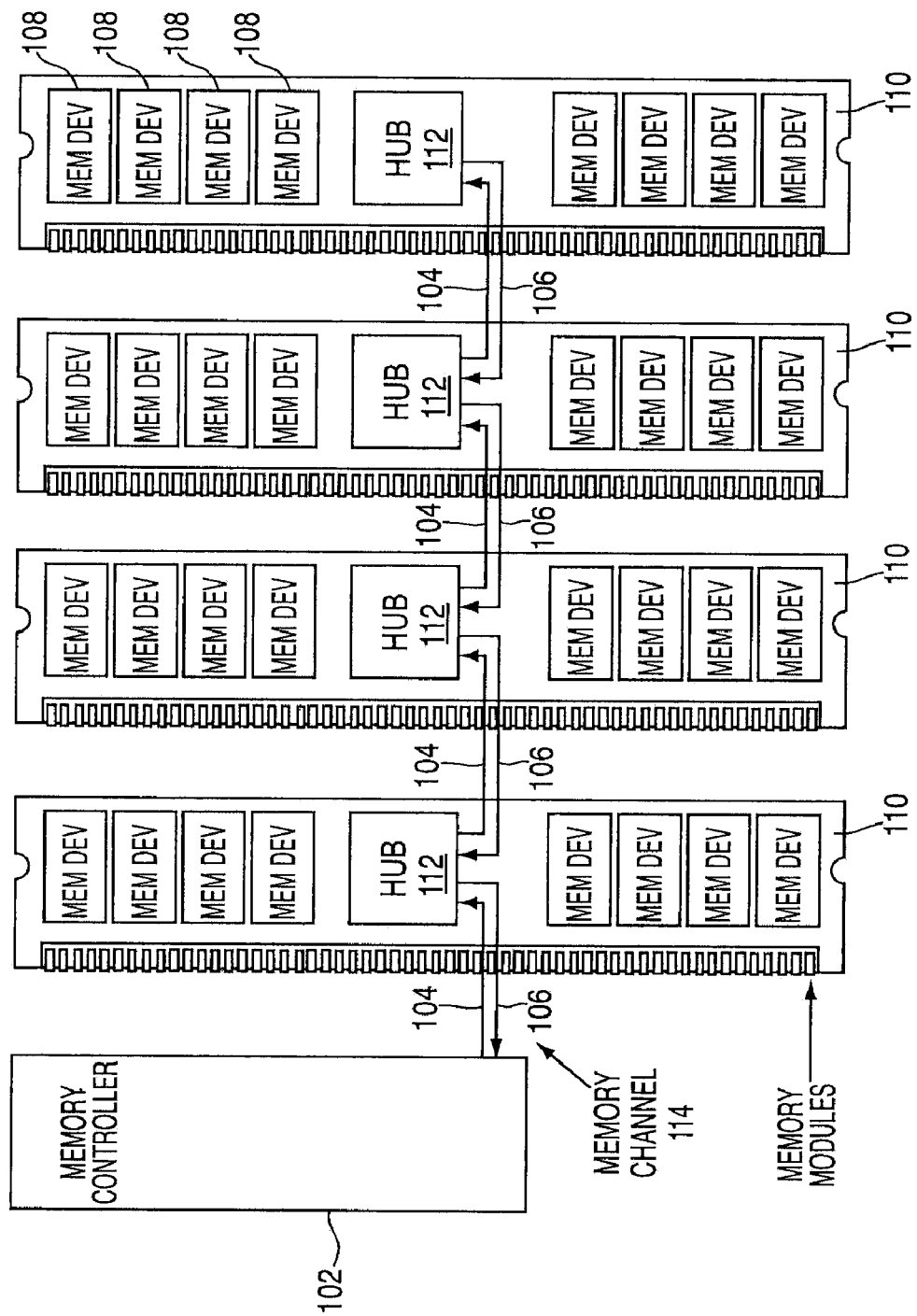
FIG. 1 depicts an exemplary memory system with multiple levels of daisy chained memory modules with point-to-point connections.

Exemplary embodiments apply to memory systems constructed of one or more memory modules 110 that are connected to a memory controller 102 by a daisy chained memory channel 114 as depicted in FIG. 1. The memory modules 110 contain both a hub device 112 that buffers commands, address and data signals to and from the controller memory channel 114 as well as one or more memory devices 108 connected to the hub device 112. The downstream portion of the memory channel 114, the downstream channel 104, transmits write data and memory operation commands to the hub devices 112. The upstream portion of the controller channel 114, the upstream channel 106, returns requested read data (referred to herein as upstream data packets).

Figure 2:
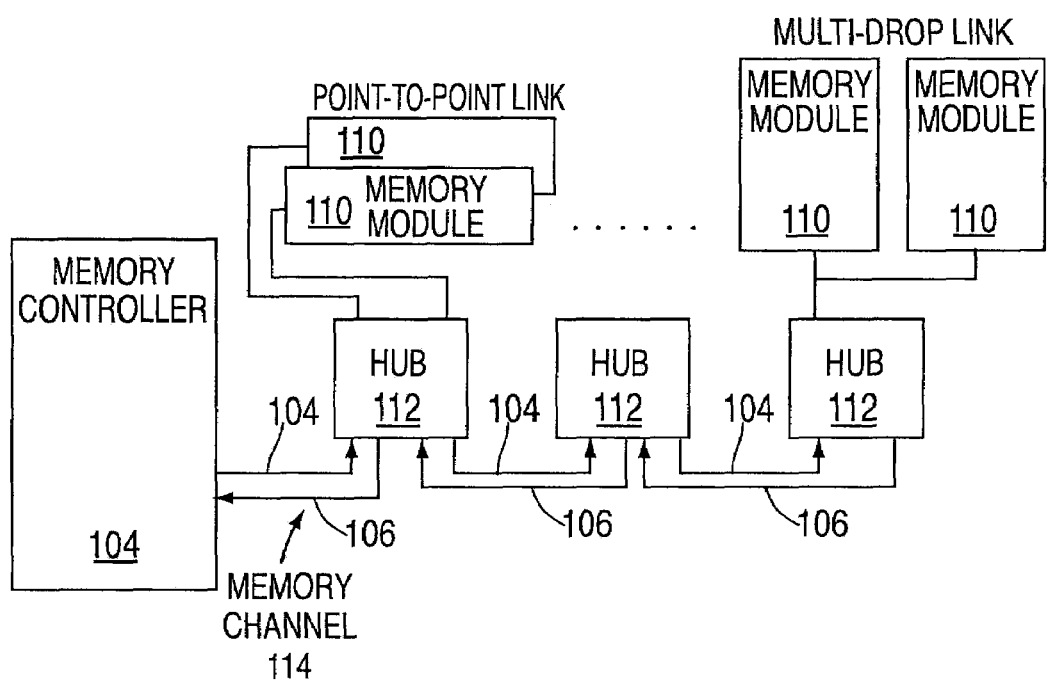
FIG. 2 depicts an exemplary memory system with hub devices that are connected to a memory modules and to a memory controller by a daisy chained channel.

FIG. 2 depicts an alternate exemplary embodiment that includes a memory system constructed of one or more memory modules 110 connected to hub devices 112 that are further connected to a memory controller 102 by a daisy chained memory channel 114. In this embodiment, the hub device 112 is not located on the memory module 110; instead the hub device 112 is in communication with the memory module 110. As depicted in FIG. 2, the memory modules 110 may be in communication with the hub devices 112 via multi-drop connections and/or point-to-point connections. Other hardware configurations are possible, for example exemplary embodiments may utilize only a single level of daisy chained hub devices 112 and/or memory modules 110.

Figure 3:
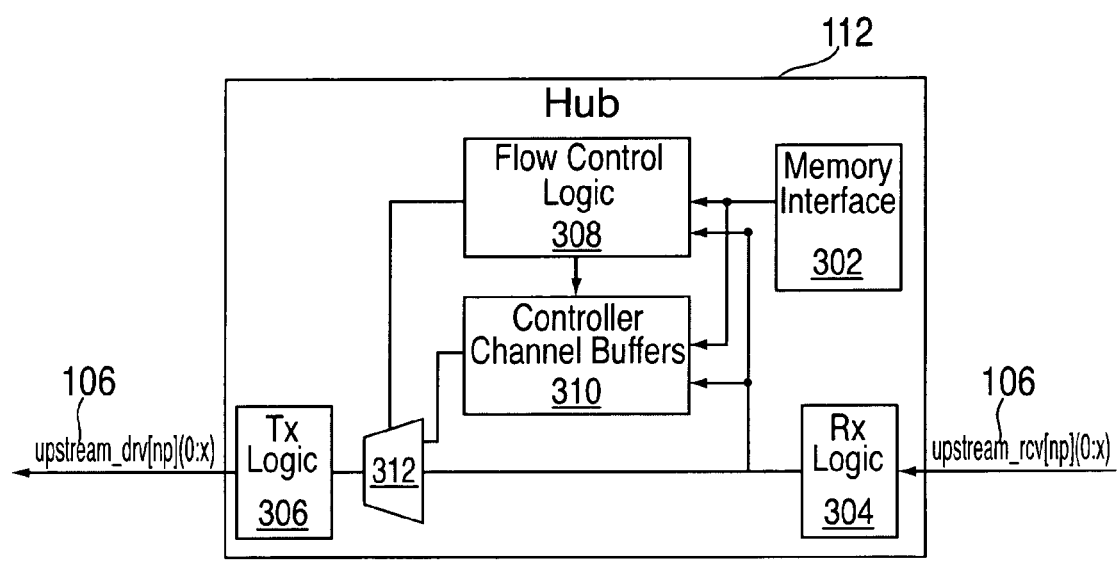
FIG. 3 depicts a hub logic device that may be utilized by exemplary embodiments.

FIG. 3 depicts a hub device 112 with flow control logic 308 utilized by exemplary embodiments to perform the processing described herein. The hub device 112 and the components within the hub device 112 may be implemented in hardware and/or software. The hub device 112 receives upstream data packets on the upstream channel 104 via the receiver logic 304 (also referred to herein as an upstream receiver). The upstream data packets are data packets being sent to the controller 102 from a hub device 112 that is downstream from the receiving hub device 112. An upstream data packet can be sent to the driver logic 306 (also referred to herein as the upstream driver) to be driven towards the controller 102 on the upstream channel 106 or, if the upstream channel 106 is busy, the upstream data packet can be temporarily stored in the CCB 310 on the hub device 112. The destination of the upstream data packet is determined by the flow control logic 308 and implemented by sending a signal to the local data mutliplexor 312.

In exemplary embodiments, CCBs 310, or buffer devices, reside in the hub device 112 and safely capture upstream data packet transfers (via the receiver logic 304) that are shunted into the CCB 310 while the hub device 112 is merging its local data packets onto the upstream channel 106. Local data packets are data packets that are read from memory devices 108 attached to the memory module 110 being directed by the hub device 112. These memory devices 108 are also referred to herein as local storage devices. The data read from the local storage devices, the local data packets, are formatted for return on an upstream controller interface via the upstream driver and stored in the CCB 310. The formatting includes serializing the local data packet into the proper frame format (e.g., see exemplary frame format depicted in FIG. 5), and inserting values into the identification tag (sourced from the read request), first transfer field, and bus cyclical redundancy code (CRC) field. In exemplary embodiments, the formatting of the local data packet is performed as part of storing the local data packet into the CCB 310.

When a data packet is received at the memory interface 302, it is stored into the CCB 310 while the local data packets are waiting to be merged onto the upstream channel 106 (via the driver logic 306). The identification tag within the data packet allows the memory controller 102 to correlate a returned read data packet with its corresponding read data request command. The data packet also contains a small, easy to decode 'start', or first transfer ('ft') field (also referred to herein as a frame start indicator) delivered near the beginning of an upstream read data frame (data packets are formatted as read data frames) which indicates that a read data frame is present in the data packet. This is used by the flow control logic 308 in the hub device 112 to monitor the channel read data activity.

When there is data in the CCBs 310 from either a local read operation or from a previously shunted read data packet from a downstream hub device (the data packets in the CCB are referred to herein as stored data packets), the hub device 112 will merge it onto the upstream channel 106 via the driver logic 306 as soon as it is allowed. The hub device 112 merges local data onto the upstream channel 106 whenever the upstream channel 106 is idle, or immediately following the last transfer of a data packet that is currently in progress. Read data frames will never be bisected using this method, but read data frames that are in flight on the upstream channel 106 that have not yet arrived at a hub device's 112 local data multiplexer 312 may be preempted and shunted into the CCB 310. This allows gaps in read data on the upstream channel 106 to be minimized which increases bus efficiency and results in reduced average read data latency under real world work load conditions.

When there are multiple read data packets present in the CCBs 310, the hub device 112 can be configured to send the read data packet corresponding to the earliest read command. This minimizes undue latency on read requests issued to hub devices 112 that are many daisy chain positions away from the memory controller 102. Other CCB 310 unload prioritization algorithms may also be implemented. For example, the identification tag field of the read data frame may contain a priority field. The priority field can be used to guide the unloading of the CCBs 310. Alternatively, priority information may be delivered as the read data is requested. Hub devices 112 can then compare the identification tag to previously recorded priority information to determine the location in the CCB 310 to send next. A method may also be employed that occasionally sends lower priority data before high priority data to ensure that low priority data is not completely stalled by requests that have been tagged with a higher priority.

Figure 4:
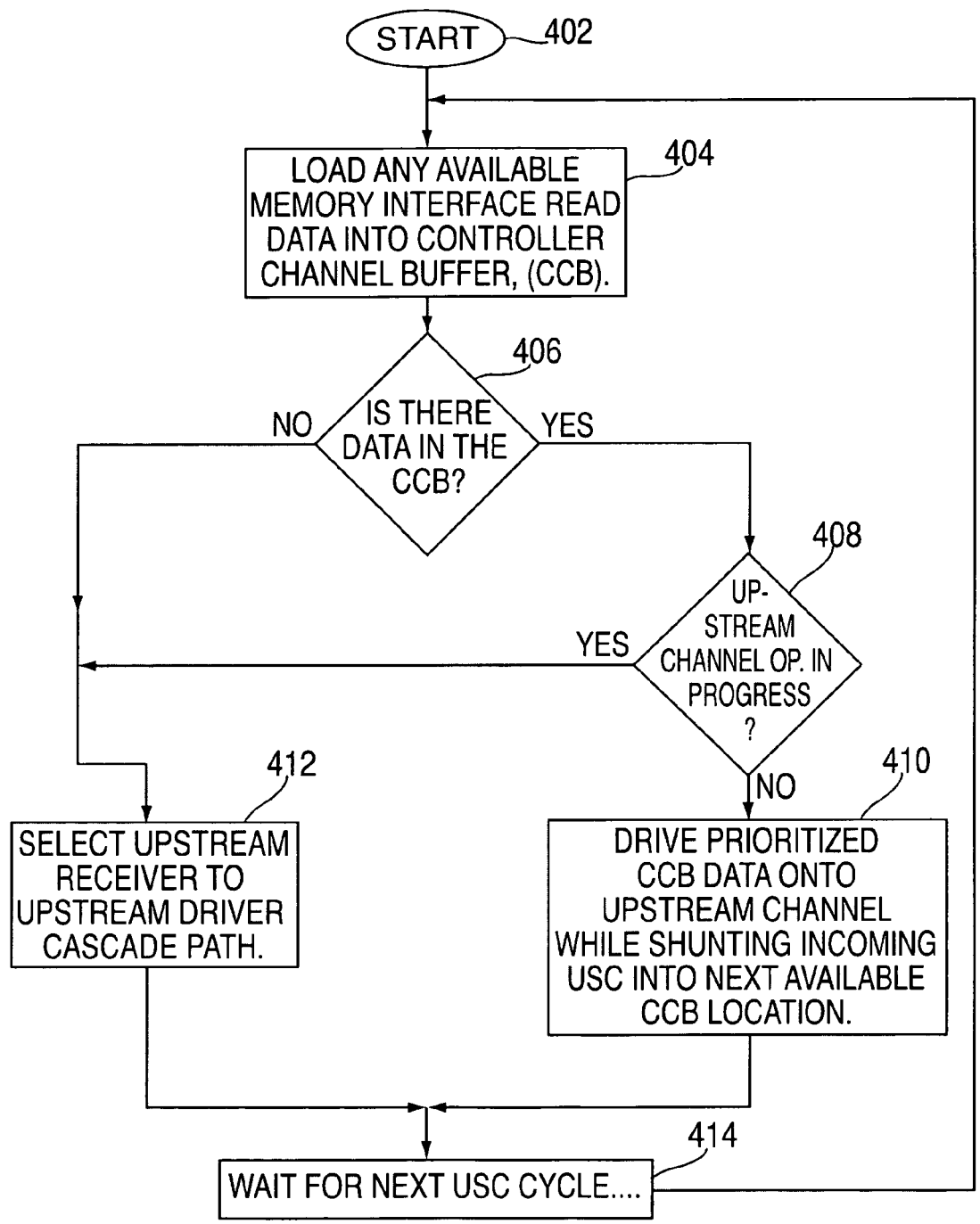
FIG. 4 is a exemplary process flow implemented by the hub logic device in exemplary embodiments.

FIG. 4 is a process flow that is facilitated by the flow control logic 308 located in the hub device 112 in exemplary embodiments. The process depicted in FIG. 4 performs preemptive local data merge and may be implemented by a mechanism including hardware and/or software instructions such as a finite state machine in the flow control logic 308. The process starts at block 402 and is repeated, in exemplary embodiments, on a periodic basis (e.g., after each controller channel transfer, or upstream channel cycle). At block 404 any local read data packets (i.e., from memory devices 108 on memory modules 110 attached to the hub device 112) in the memory interface 302 are loaded into the CCB 310. This insures that the flow control logic 308 is aware of and managing the upstream driving of local read data. At block 406, it is determined if there is data in the CCB 310. If there is no data in the CCB 310, then the data is routed from the receiver logic 304 to the driver logic 306 at block 412. The routing is directed by the flow control logic 308 by setting the local data multiplexer 312 to send the upstream data packet to the driver logic 306 for driving the upstream data packet onto the upstream channel 106 towards the controller 102. Processing then continues at 414, where processing is sent back to block 404 at the next upstream channel cycle.

If it is determined at block 406, that there is data in the CCB 310 then block 408 is performed to determine if an upstream channel operation is in process (i.e., is an upstream data packet or a local read data packet in the middle of being driven onto the upstream channel 106 via the driver logic 306). Processing continues at block 412 if an upstream channel operation is in process (i.e., the driver is busy). At block 412, upstream read data packets are routed from the receiver logic 304 to the driver logic 306 by setting the local data multiplexer 312 to send the upstream data packet to the driver logic 306. Alternatively, processing continues at block 410 if an upstream channel operation is not in process (i.e., the driver is idle) and there is data in the CCB 310. At block 410, data from the CCB 310 is driven onto the upstream channel 106 while any data packets received in the receiver logic 304 from the upstream channel 106 are shunted (stored) into the next available CCB 310 location. The shunting is performed by the flow control logic 308 directing the upstream data packets to be loaded into the CCB 310. Processing then continues at 414 which sends processing back to block 404 at the next upstream channel cycle.

Figure 5:
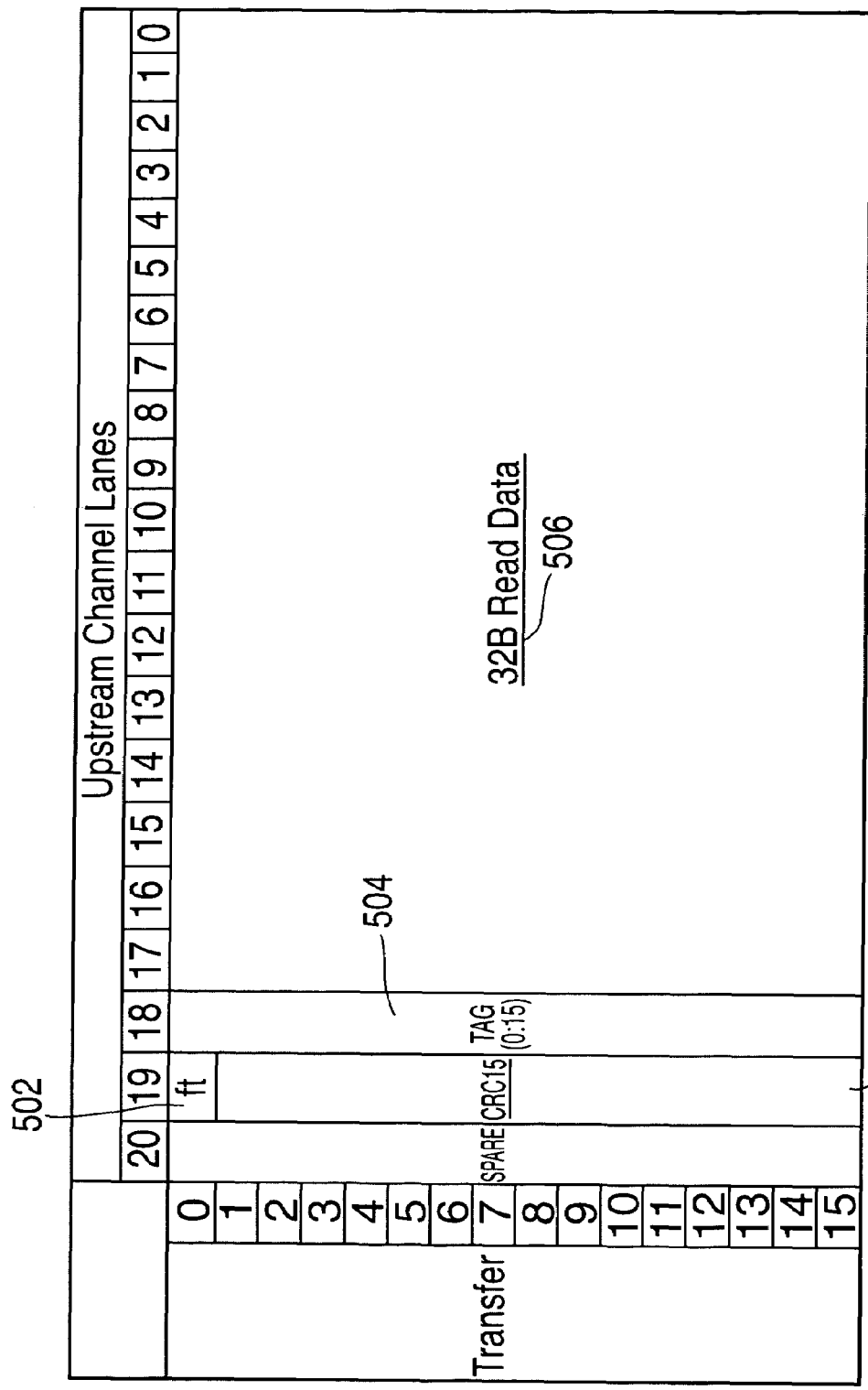
FIG. 5 is a read data format that may be utilized by exemplary embodiments.

FIG. 5 is an exemplary read data frame format for upstream data packets and local read data packets on the upstream channel 106. The frame format depicted in FIG. 5 uses twenty-one signal lanes and each packet includes sixteen transfers. It includes a one bit first start indicator 502 and an identification tag 504, as well as 256 bits (32 B) of read data 506 with a bus CRCs 508 for transmission error detection. Other combinations of signal lanes and transfer depths can be used to create frame formats that include a frame start indicator, read data identification tag and read data that are compatible with this invention.

Exemplary embodiments pertain to a computer memory system constructed of daisy chained hub logic devices connected to, or contained upon, memory modules. The hubs are daisy chained on a memory controller channel and are further attached to memory devices on the memory modules. The memory controller issues requests for read data to the hubs which merge this read data from the memory modules onto the memory channel. Using channel buffers and packet identification tags, the hubs are able to return read data at a time unpredicted by the memory controller, and at a time that may preempt a read request that had been issued earlier, without loosing or corrupting any of the read data returned on the channel to the memory controller.

Exemplary embodiments may be utilized to optimize average read data latency by more fully utilizing the upstream channel. Through the use of CCBs, read data frame formats with identification tags and a preemptive data merge technique, indeterminate read data latency may be performed to more fully utilize the controller channel.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing indeterminate read data latency in a memory system, the method comprising:
    determining if a local data packet has been received;
    if the local data packet has been received, then storing the local data packet into a buffer device;
    determining if the buffer device contains one or more data packets;
    determining if an upstream driver for transmitting the one or more data packets to a memory controller via an upstream channel is idle;
    if the buffer device contains the one or more data packets and the upstream driver is idle, then transmitting a selected data packet of the one or more data packets to the upstream driver;
    determining if an upstream data packet has been received, the upstream data packet in a multi-transfer frame format that includes a single bit frame start indicator in a first transfer and an identification tag for use by the memory controller in associating the upstream data packet with its corresponding read instruction, the identification tag distributed over each transfer of multiple transfers for the entire upstream data packet;
    if the upstream data packet has been received and the upstream driver is not idle, then storing the upstream data packet into the buffer device, the buffer device configured to store both the local data packet and the upstream data packet as the one or more data packets;
    if the upstream data packet has been received and the buffer device does not contain the one or more data packets and the upstream driver is idle, then transmitting the upstream data packet to the upstream driver; and
    continuing to transmit any in-progress data packet if the upstream driver is not idle.

2. The method of claim 1 wherein the determining if the local data packet has been received, the determining if the buffer device contains the one or more data packets, the determining if the upstream driver is idle and the determining if the upstream data packet has been received are performed on a periodic basis.

3. The method of claim 2 wherein the periodic basis is once every upstream channel cycle.

4. The method of claim 1 wherein the selected data packet is selected for transmitting based on a prioritization algorithm.

5. The method of claim 4 wherein the prioritization algorithm selects the selected data packet based on an age of the read instruction that corresponds to the selected data packet.

6. The method of claim 4 wherein the prioritization algorithm selects the selected data packet based on a priority associated with the selected data packet, and farther wherein the selected data packet is formatted in the multi-transfer frame format that includes the frame start indicator and the identification tag, the priority included in a priority field of the identification tag, and the prioritization algorithm periodically selects a lower priority data packet before a higher priority data packet as the selected data packet.

7. The method of claim 1 wherein the multi-transfer frame format farther includes a bus cyclical redundancy code (CRC) field, the bus CRC field distributed over the multiple transfers excluding the first transfer and located in a common bit position with the frame staff indicator.

8. The method of claim 7 wherein the storing the local data packet into the buffer device includes formatting the local data packet, the formatting including serializing the local data packet into the multi-transfer frame format and inserting values into the frame staff indicator, the identification tag and the bus CRC field.

9. A hub device in a memory system, the hub device comprising:
    a device for receiving data packets, the device including an upstream receiver for receiving upstream data packets from a downstream hub device and a memory interface for receiving local data packets from a local storage device, wherein each data packet is in a multi-transfer frame format that includes a single bit frame start indicator in a first transfer and an identification tag for use by a memory controller in associating the data packet with its corresponding read instruction, the identification tag distributed over each transfer of multiple transfers for the entire data packet;
    an upstream driver for transmitting the data packets to the memory controller via an upstream channel; and
    a mechanism including instructions for facilitating:
        determining if a local data packet has been received;
        if the local data packet has been received, then storing the local data packet into a buffer device;
        determining if the buffer device contains one or more data packets;
        determining if the upstream driver is idle;
        if the buffer device contains the one or more data packets and the upstream driver is idle, then transmitting a selected data packet of the one or more data packets to the upstream driver;
        determining if an upstream data packet has been received;
        if the upstream data packet has been received and the upstream driver is not idle, then storing the upstream data packet into the buffer device, the buffer device configured to store both the local data packet and the upstream data packet as the one or more data packets;
        if the upstream data packet has been received and the buffer device does not contain the one or more data packets and the upstream driver is idle, then transmitting the upstream data packet to the upstream driver; and
        continuing to transmit any in-progress data packets if the upstream driver is not idle.

10. The hub device of claim 9 wherein the determining if the local data packet has been received, the determining if the buffer device contains the one or more data packets, the determining if the upstream driver is idle and the determining if the upstream data packet has been received are performed on a periodic basis.

11. The hub device of claim 10 wherein the periodic basis is once every upstream channel cycle.

12. The hub device of claim 9 wherein the selected data packet is selected for transmitting based on a prioritization algorithm.

13. The hub device of claim 12 wherein the prioritization algorithm selects the selected data packet based on an age of the read instruction that corresponds to the selected data packet.

14. The hub device of claim 12 wherein the prioritization algorithm selects the selected data packet based on a priority associated with the selected data packet, and further wherein the selected data packet is formatted in the multi-transfer frame format that includes the frame start indicator and the identification tag, the priority included in a priority field of the identification tag, and the prioritization algorithm periodically selects a lower priority data packet before a higher priority data packet as the selected data packet.

15. The hub device of claim 9 wherein the multi-transfer frame format further includes a bus cyclical redundancy code (CRC) field, the bus CRC field distributed over the multiple transfers excluding the first transfer and located in a common bit position with the frame start indicator.

16. A memory controller for use in a memory system, the memory controller comprising:
    an upstream channel for receiving one or more read data packets at an unpredicted time from a downstream hub device, each packet in a multi-transfer frame format including a single bit frame start indicator in a first transfer and an identification tag distributed over each transfer of multiple transfers for the entire packet; and
    logic for correlating the received data packets at the memory controller with their corresponding read data request commands using the identification tags included in the read data packets.

17. The memory controller of claim 16 wherein each read data packet is received at an unpredicted time relative to its corresponding read request command.

18. The memory controller of claim 16 wherein the read data packets are received in an unpredicted order relative to an issue order of their corresponding read request commands.

19. The memory controller of claim 16 wherein the multi-transfer frame format further includes a bus cyclical redundancy code (CRC) field, the bus CRC field distributed over the multiple transfers excluding the first transfer and located in a common bit position with the frame start indicator.

20. A memory system comprising:
    a memory controller comprising:
        an upstream channel for receiving one or more read data packets at an unpredicted time relative to its corresponding read request command, each read data packet in a multi-transfer frame format including a single bit frame start indicator in a first transfer and an identification tag distributed over each transfer of multiple transfers for the entire upstream read data packet; and
        computer instructions for correlating the received one or more read data packets at the memory controller with one or more corresponding read data request commands using the identification tag included in each of the one or more read data packets;
    one or more memory modules with one or more memory devices connected to the memory controller by a daisy chained channel, wherein the read data is returned to the memory controller as the one or more read data packets; and
    one or more hub devices on the memory modules for buffering address, commands and data, the hub devices including controller channel buffers used in conjunction with preemptive local data merge logic to minimize read data latency and enable indeterminate read data return times to the memory controller.

21. The memory system of claim 20 wherein each of the one or more hub devices includes an upstream driver and performs:
    determining if a local data packet has been received;
    if the local data packet has been received, then storing the local data packet into a buffer device;
    determining if the buffer device contains one or more data packets;
    determining if the upstream driver is idle;
    if the buffer device contains the one or more data packets and the upstream driver is idle, then transmitting a selected data packet of the one or more data packets to the upstream driver;
    determining if an upstream data packet has been received;
    if the upstream data packet has been received and the upstream driver is not idle, then storing the upstream data packet into the buffer device, the buffer device configured to store both the local data packet and the upstream data packet as the one or more data packets;
    if the upstream data packet has been received and the buffer device does not contain the one or more data packets and the upstream driver is idle, then transmitting the upstream data packet to the upstream driver; and
    continuing to transmit any in-progress data packets if the upstream driver is not idle.

22. The memory system of claim 21 wherein the determining if the local data packet has been received, the determining if the buffer device contains the one or more data packets, the determining if the upstream driver is idle and the determining if the upstream data packet has been received are performed on a periodic basis once every upstream channel cycle.

23. The memory system of claim 21 wherein the selected data packet is selected for transmitting based on a prioritization algorithm to selects the selected data packet based on an age of the read instruction that corresponds to the selected data packet, and further wherein the selected data packet is formatted in the multi-transfer frame format that includes the frame start indicator and the identification tag, the priority included in a priority field of the identification tag, and the prioritization algorithm periodically selects a lower priority data packet before a higher priority data packet as the selected data packet.

24. The memory system of claim 20 wherein the multi-transfer frame format further includes a bus cyclical redundancy code (CRC) field, the bus CRC field distributed over the multiple transfers excluding the first transfer and located in a common bit position with the frame staff indicator.

25. The memory system of claim 24 wherein the storing the local data packet into the buffer device includes formatting the local data packet, the formatting including serializing the local data packet into the multi-transfer frame format and inserting values into the frame staff indicator, the identification tag and the bus CRC field.

* * * * *